(12) United States Patent
Ryang

(10) Patent No.: US 7,153,898 B2
(45) Date of Patent: Dec. 26, 2006

(54) METAL OXIDE SOLS AS NANOSCALE ADDITIVES FOR POLYMERS

(75) Inventor: Hong-Son Ryang, Camarillo, CA (US)

(73) Assignee: APS Laboratory, Camarillo, CA (US)

( * ) Notice: Subject to any disclaimer, the term of this patent is extended or adjusted under 35 U.S.C. 154(b) by 378 days.

(21) Appl. No.: 10/886,143

(22) Filed: Jul. 7, 2004

(65) Prior Publication Data

US 2004/0242740 A1   Dec. 2, 2004

Related U.S. Application Data

(62) Division of application No. 10/337,624, filed on Jan. 7, 2003, now Pat. No. 6,955,771.

(51) Int. Cl.
*C08K 5/55* (2006.01)
*C08K 3/22* (2006.01)
*C08K 3/38* (2006.01)
*C08K 3/34* (2006.01)

(52) U.S. Cl. .................. 524/183; 524/430; 524/405; 524/261

(58) Field of Classification Search ............... 524/183, 524/430, 405, 261
See application file for complete search history.

(56) References Cited

U.S. PATENT DOCUMENTS

| 4,980,427 | A | 12/1990 | Ryang et al. |
|---|---|---|---|
| 5,962,608 | A | 10/1999 | Ryang et al. |
| 6,169,119 | B1 | 1/2001 | Ryang et al. |
| 6,201,051 | B1 * | 3/2001 | Mager et al. ............... 524/261 |
| 6,261,687 | B1 | 7/2001 | Ryang et al. |
| 6,432,191 | B1 * | 8/2002 | Schutt .................. 106/287.13 |
| 6,500,871 | B1 | 12/2002 | Gerardin et al. |
| 6,579,472 | B1 | 6/2003 | Chung et al. |
| 2001/0056141 | A1 | 12/2001 | Schutt |
| 2003/0024432 | A1 | 2/2003 | Chung et al. |
| 2003/0133890 | A1 | 7/2003 | Kato et al. |
| 2003/0144469 | A1 | 7/2003 | Kauffman et al. |

FOREIGN PATENT DOCUMENTS

JP        04080030 A  *  3/1992

OTHER PUBLICATIONS

International Search Report for PCT/US04/00323 filed Jan. 7, 2004, Date of Mailing May 7, 2004.

* cited by examiner

*Primary Examiner*—Ling-Sui Choi
*Assistant Examiner*—Satya Sastri
(74) *Attorney, Agent, or Firm*—Amin & Turocy, LLP

(57) ABSTRACT

Disclosed are metal oxide sols made by mixing at least one metal alkoxide, wherein the metal is a transition metal, a post-transition metal, an alkali metal, or alkaline earth metal; at least one organosilane; at least one boron oxide compound selected from the group consisting of boric acid, alkoxy boron compounds, hydrocarbyl boric acids, hydrocarbyl hydroxy boron alkoxides, and hydroxy boron alkoxides; and a liquid. Also disclosed are composites containing a polymer and the metal oxide sols.

20 Claims, No Drawings

METAL OXIDE SOLS AS NANOSCALE ADDITIVES FOR POLYMERS

RELATED APPLICATIONS

This patent application is a Division of application Ser. No. 10/337,624 filed on Jan. 7, 2003, now U.S. Pat. No. 6,955,771.

FIELD OF THE INVENTION

The present invention generally relates to metal oxide sols, polymers containing the metal oxide sols, and related methods. In particular, the present invention relates to stable metal oxide sols that can be uniformly incorporated into a polymer matrix.

BACKGROUND OF THE INVENTION

In the last century, synthetic polymers have revolutionized the way in which we live. From synthetic rubber used in tires to structural plastic used in automobiles, synthetic polymers are used everywhere. A myriad of products and components for products are made, at least in part, of a polymer material. As the uses for polymers continue to increase, it becomes more and more desirable to improve the properties of polymers.

For example, silica, graphite, carbon black, and clay among many other materials have been incorporated into polymers in attempts to improve the properties of the resultant composites. While improvements have been realized, further improvements are desired.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention provides very stable metal oxide sols. The stable metal oxide sols can be uniformly incorporated into various polymer systems on a molecular level thereby improving one or more of the polymer properties. The present invention thus also provides polymer compositions with one or more of improved strength, improved corona resistance, improved plasma resistance, improved resistance to organic solvents, improved high temperature stability, improved flame retardancy, improved oxidative stability, refractive index modification, improved fracture properties, improved abrasion resistance, improved liquid permeability, improved gas permeability including improved gas permeability to specific gases, improved (low) hysteresis loss (low rolling resistance), and the like. When used with a translucent polymer, the resulting polymer composition remains clear or translucent.

One aspect of the invention relates to metal oxide sol compositions made by mixing certain amounts of at least one metal alkoxide, at least one organosilane, at least one boron oxide compound, and a liquid.

Another aspect of the invention relates to dried metal oxide sol compositions containing certain amounts of at least one metal alkoxide, at least one organosilane, at least one boron oxide compound, and no substantial amounts of water or organic solvent.

Yet another aspect of the invention relates to composite compositions containing a major amount of a polymer and a minor amount of a metal oxide sol dispersed within the polymer, the metal oxide sol containing at least one metal alkoxide, at least one organosilane, and at least one boron oxide compound.

Still yet other aspects of the invention relate to methods of making the metal oxide sol compositions, methods of making the dried metal oxide sol compositions, methods of making the composite compositions, and methods of improving various characteristics of polymers.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The metal oxide sols of the present invention are prepared by combining certain relative amounts at least three components: at least one metal alkoxide compound, at least one organosilane, and at least one boron oxide compound with a liquid such as water and/or an organic solvent. The metal oxide sols of the present invention are stable over a long period of time, may be stored in a dry state, and are compatible with polymer systems.

A "sol", as the term is used herein, refers to a composition comprising a liquid colloidal dispersion containing a liquid phase and a dispersed phase. The liquid phase of the liquid colloidal dispersion may be aqueous and/or organic. The liquid phase may also be a liquid or partially liquid substance to which a metal oxide sol can be added, such as resin monomers. For example, in the case where it is desired to incorporate metal oxide sols into a polymer, the liquid phase of the metal oxide sols may be constituted by a polymer monomer in liquid form. A "dried sol" results when the liquid phase of a sol is removed.

The term "hydrocarbyl" as used herein includes hydrocarbon as well as substantially hydrocarbon groups. Substantially hydrocarbon describes groups which contain heteroatom substituents which do not alter the predominantly hydrocarbon nature of the group. Examples of hydrocarbyl groups include hydrocarbon substituents, i.e., aliphatic (e.g., alkyl or alkenyl) and substituted aliphatic substituents, alicyclic (e.g., cycloalkyl, cycloalkenyl) substituents, aromatic-, aliphatic- and alicyclic-substituted aromatic substituents, fluorocarbon groups, polysiloxanes, and alkylates. Heteroatoms include, by way of example, fluorine, nitrogen, oxygen, silicon, and sulfur.

Metal alkoxide compounds include a metal and at least one alkoxide group. Metal alkoxides include metal methoxides, metal ethoxides, metal isopropoxides, metal propoxides, metal butoxides, metal ethylhexoxides, metal (triethanolaminato)isopropoxides, chelated metal alkoxides such as metal bis(2,4-pentanedionate)diisopropoxides, metal bis(ethyl acetoacetato)diisopropoxides, and metal trifluoroacetylacetonates. Metal alkoxides also include at least one of transition metal alkoxides, posttransition metal alkoxides, alkali metal alkoxides, and alkaline earth metal alkoxides.

The metal of the metal oxide compounds include at least one transition metal and/or alkaline earth metal and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, Ba, La, Hf, Ta, W, Re, Os, Ir, Pt, Au, Hg and Ac. Post-transition metals include Al, Ga, In, Tl, Ge, Sn, Pb, Sb, Bi, and Po. Alkali metals include Li, Na, K, Rb and Cs. Alkaline earth metals include Be, Mg, Ca, Sr and Ba. In one embodiment, the metal of the metal oxide compound is at least one of aluminum, titanium and zirconium.

Metal oxide compounds are commercially available or can be made from precursor compounds such as transition metal halides, alkaline earth metal halides, post-transition metal halides, alkali metal halides, transition metal nitrates, alkaline earth metal nitrates, post-transition metal nitrates, and alkali metal nitrates.

In one embodiment, metal oxide compounds can be represented by Formula I:

$$M_aO_k(OR)_b \qquad (I)$$

wherein each M is a transition metal, alkaline earth metal, post-transition metal, or alkali metal, each R is independently a hydrogen or a hydrocarbyl group containing from 1 to about 18 carbon atoms (at least one R is a hydrocarbyl group), a is from 1 to about 5, k is 0 to about 10, and b is from 1 to about 20. In some instances, R may be a hydrogen atom provided that at least one or at least two Rs are hydrocarbyl groups containing from 1 to about 8 carbon atoms. In another embodiment, each R is independently a hydrocarbyl group containing from 1 to about 6 carbon atoms, a is from 1 to about 4, k is from 0 to about 3, and b is from 1 to about 6. In yet another embodiment, each R is independently a hydrocarbyl group containing from 1 to about 4 carbon atoms, a is from 1 to about 3, and b is from 1 to about 4.

Specific examples of metal oxide compounds include aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, lanthanum methoxyethoxide, and combinations of two or more of the above compounds.

Metal carboxylates may also be optionally added to make the metal oxide sols. Metal carboxylates include metal acetates, metal ethylhexanoates, metal gluconates, metal oxalates, metal propionates, metal pantothenates, metal cyclohexanebutyrates, metal bis(ammonium lacto)dihydroxides, metal citrates, and metal methacrylates. The metals are the same metals as the metal alkoxides. Specific examples of metal carboxylates include aluminum lactate, calcium acetate, calcium ethylhexanoate, calcium gluconate, calcium oxalate, calcium propionate, calcium pantothenate, calcium cyclohexanebutyrate, magnesium acetate, magnesium methylcarbonate, magnesium gluconate, tin acetate, tin oxalate, titanium bis(ammonium lacto)dihydroxide, zinc acetate, zinc methacrylate, zinc stearate, zinc cyclohexanebutyrate, zirconium acetate, zirconium citrate.

Organosilanes include compounds represented by Formula II:

$$(R^2)_{4-c}Si(X)_c \qquad (II)$$

wherein c is 2 to about 4, each $R^2$ is individually a hydrogen or an organofunctional containing organic group containing from about 1 to about 24 carbon atoms including at least one from the group consisting of heterocyclic, acryloxy, amino, amide, vinyl, epoxy, glycidoxy, alkyl, a carbon carbon triple bond containing group, mercapto, siloxy, halocarbon such as fluorocarbon, and a carbon carbon double bond containing group, and each X is individually a hydrocarbyloxy or alkoxy group containing from 1 to about 8 carbon atoms, or chlorine, bromine, or iodine. Examples of alkoxy groups include methoxy, ethoxy, propoxy and butoxy groups.

Examples of organosilanes include tetramethoxysilane, tetraethoxysilane, tetrapropoxysilane, tetra-n-butoxysilane, and the like, and organofunctional silanes.

Organosilanes include organofunctional silanes, which are compounds represented by Formula III:

$$(R^2)_{4-c}Si(X^2)_c \qquad (III)$$

but wherein c is 1 to 4, each $X^2$ is individually an alkoxy group containing from 1 to about 4 carbon atoms, and each $R^2$ is individually a hydrogen or an organofunctional containing organic group containing from about 1 to about 24 carbon atoms including at least one from the group consisting of heterocyclic, acryloxy, amino, amide, vinyl, epoxy, glycidoxy, alkyl, a carbon carbon triple bond containing group, mercapto, siloxy, halocarbon such as fluorocarbon, and a carbon carbon double bond containing group. In another embodiment, c is 2 or 3, $X^2$ is individually an alkoxy group containing from 1 to about 2 carbon atoms, and each $R^2$ is individually an organofunctional containing organic group containing from about 2 to about 8 carbon atoms.

When an organofunctional containing organic group ($R^2$) is contained by the organosilane, the particular functional group is selected so that it is compatible with the polymer in which the metal oxide sols may be incorporated. Specific examples of heterocyclic groups include substituted and unsubstituted pyrroles, pyrazoles, imidazoles, pyrrolidines, pyridines, pyrimidines, oxazoles, thiazoles, furans, thiophenes, dithianes, and isocyanurates. Specific examples of acryloxy groups include acryloxy, alkylacryloxy groups such as methacryloxy, and the like. Specific examples of carbon carbon double bond containing groups include alkenyl, cyclopentadienyl, styryl, and phenyl.

Further examples of organosilanes include phenyltrimethoxysilane; phenyltriethoxysilane; diphenyldimethoxysilane; diphenyldiethoxysilane; 3-aminopropyltrimethothysilane; 3-aminopropyltriethoxysilane; N-(3-trimethoxysilylpropyl)pyrrole; N-[3-(triethoxysilyl)propyl]-4,5-dihydroimidazole; beta-trimethoxysilylethyl-2-pyridine; N-phenylaminopropyltrimethoxysilane; 3-(N-styrylmethyl-2-aminoethylamino)propyltrimethoxysilane; methacryloxypropenyltrimethoxysilane; 3-methacryloxypropyltrimethoxysilane; 3-methacryloxypropyltris(methoxyethoxy)silane; 3-cyclopentadienylpropyltriethoxysilane; 7-oct-1-enyltrimethoxysilane, Prosil® 9214 from PCR, Inc. (a carboxy amide silane); 3-glycidoxypropyl-trimethoxysilane; gamma-glycidoxypropylmethyldimethoxysilane; gamma-glycidoxypropylpylpentamethyldisiloxane; gamma-glycidoxypropylmethyldiethoxysilane; gamma-glycidoxypropyldimethylethoxysilane; (gamma-glycidoxyproply)-bis-(trimethylsiloxy)methylsilane; vinylmethyldiethoxysilane; vinylmethyidimethoxysilane; methylaminopropyltrimethoxysilane; n-octyltriethoxysilane; n-octyltrimethoxysilane; hexyltriethoxysilane; isobutyltrimethoxysilane; 3-ureidopropyltriethoxysilane; 3-isocyanatepropyltriethoxysilane; N-phenyl-3-aminopropyltrimethoxysilane; 3-triethoxysilyl-N-(1,3-dimethyl-butyliden) propylamine; N-2(aminoethyl)3-aminopropyltriethoxysilane; N-2(aminoethyl)3-aminopropyltrimethoxysilane; N-2(aminoethyl)3-aminopropylmethyidimethoxysilane; 3-acryloxypropyltrimethoxysilane; methacryloxypropylmethyldiethoxysilane; methacryloxypropylmethyldimethoxysilane; glycidoxypropylmethyldiethoxysilane; 2-(3,4 epoxycyclohexyl)-ethyltrimethoxysilane; vinyltrimethoxysilane; vinyltriethoxysilane; amonophenyltrimethoxysilane; triethoxysilane; p-chloromethyl)phenyltri-n-propoxysilane; diphenylsilanediol; 2-(3,4-epoxycyclohexyl) ethyltrimethoxysilane; epoxyhexyltriethoxysilane; tris(3-trimethoxysilylpropyl)isocyanurate; dococentyltrimethoxysilane; 3-mercaptopropyltriethoxysilane; 1,4-bis(trimethoxysilylethyl)benzene; phenylsilane; trimethoxysilyl-1,3-dithiane; n-trimethoxysilylpropylcarbamoylcaprolactam; and the like.

Organosilanes are commercially available from a number of sources including under the trade designation Prosil® from Clariant and from ShinEtsu among others, or they may be prepared from organosilane precursor compounds such as corresponding halosilanes, such as vinyltrichlorosilane.

Boron oxide compounds contain at least boron and oxygen atoms. Boron oxide compounds include boric acid $(B(OH)_3)$, alkoxy boron compounds (or boron alkoxides), hydrocarbyl boric acids, hydrocarbyl hydroxy boron alkoxides, and hydroxy boron alkoxides. In one embodiment, boron oxide compounds can be represented by Formula IV:

$$B(OH)_d(OR)_{3-d} \qquad (IV)$$

wherein each R is independently a hydrocarbyl group containing from 1 to about 8 carbon atoms, and d is from 0 to about 3. In another embodiment, each R is independently a hydrocarbyl group containing from 1 to about 4 carbon atoms, and d is from 1 to about 2. In yet another embodiment, boron oxide compounds can be represented by Formula V:

$$B(OH)_e(OR)_f(R^3)_{3-(e+f)} \qquad (V)$$

wherein each R is independently a hydrocarbyl group containing from 1 to about 8 carbon atoms, each $R^3$ is independently a hydrocarbyl group containing from 1 to about 24 carbon atoms, e is from 0 to about 3, and f is from 0 to about 3. In still yet another embodiment, each R is independently a hydrocarbyl group containing from 1 to about 4 carbon atoms and each $R^3$ is independently a hydrocarbyl group containing from 1 to about 10 carbon atoms.

Specific examples of boron oxide compounds include boric acid, boron tri-n-butoxide, boron tri-sec-butoxide, boron tri-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetylphenylboronic acid, 4-acetylphenylboronic acid, 5-chlorothiophene-2-boronic acid, 1,4-phenylenebis (boronic acid), (2-carboxyphenyl)boronic acid, (3-carboxyphenyl)boronic acid, (4-carboxyphenyl)boronic acid, (3,4-methylenedioxyphenyl)boronic acid, 4-methylthio) phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, (4-methyl-1-naphthalene)boronic acid, and the like.

Boric oxide and boric acids are commercially available. For example, boric acids are available from Aldrich, Acros Organics, and Ryscor Science, Inc. Boron alkoxides and hydroxy boron alkoxides can be synthesised by the dehydration of mixtures of alcohol with boric oxide or boric acid. For example, boric acid and ethanol can be used to synthesise boron triethoxide.

The metal oxide sols are prepared by combining the metal alkoxide, the organosilane, and the boron oxide compound in any suitable order with a liquid such as water and/or an organic solvent. In this connection, the metal alkoxide, the organosilane, and the boron oxide compound may be simultaneously combined; the metal alkoxide and the organosilane may be initially combined, followed by addition of the boron oxide compound; the metal alkoxide and the boron oxide compound may be initially combined, followed by addition of the organosilane; or the boron oxide compound and the organosilane may be initially combined, followed by addition of the metal alkoxide.

The metal alkoxide, organosilane, and boron oxide compound are combined in a liquid. The liquid is at least one of water and an organic solvent. In one embodiment, the metal alkoxide, organosilane, and boron oxide compound are combined in a mixture of water and at least one organic solvent. In another embodiment, the metal alkoxide, organosilane, and boron oxide compound are combined in water, followed by addition of an organic solvent. In yet another embodiment, the metal alkoxide, organosilane, and boron oxide compound are combined in an organic solvent, followed by addition of water. Irregardless of the liquid protocol, a certain minimum amount of water is desirably provided to facilitate formation of stable sols.

The minimum amount of water, in moles, can be determined based on the empirical equation of the sol formation. More specifically, in one embodiment, representing the reaction as follows:

$$gM_aO_k(OR)_b + h(R^2)_{4-c}Si(X)_c + iB(OH)_e(OR)_f(R^3)_{3-(e+f)} + jH_2O \Rightarrow \text{metal oxide sol}$$

where M, R, $R^2$, $R^3$, X, a, b, c, e, k, and f are as defined above, and g, h, i, and j are the number of moles of each component. The minimum amount of water, and thus j, is determined using the following equation: $(gb+hc+if)/2$. That is, in the above reaction, $j \geq (gb+hc+if)/2$. In another embodiment, $j > (gb+hc+if)/2$. This minimum amount of water is referred to as a sol facilitating amount of water. The water may be added when combining the metal alkoxide, organosilane, and boron oxide compound with an organic solvent, or when combining the metal alkoxide, organosilane, and boron oxide compound with a polymer, or just after combining the three components with a polymer.

Certain relative amounts of the metal alkoxide, organosilane, and boron oxide compounds are combined in order to facilitate the formation of stable metal oxide sols. Stoichometric or greater amounts of the organosilane and boron oxide compounds are employed, relative to the metal alkoxide. Referring again to the reaction equation above, hc≧gb and i(e+f)≧gb. In another embodiment, hc>gb and i(e+f)>gb.

In one embodiment, from about 10 mole % to about 45 mole % of the metal alkoxide, from about 25 mole % to about 80 mole % of the organosilane, and from about 15 mole % to about 50 mole % of the boron oxide compound are combined to form the metal oxide sols. In another embodiment, from about 15 mole % to about 40 mole % of the metal alkoxide, from about 30 mole % to about 75 mole % of the organosilane, and from about 20 mole % to about 45 mole % of the boron oxide compound are combined to form the metal oxide sols. In yet another embodiment, from about 20 mole % to about 35 mole % of the metal alkoxide, from about 35 mole % to about 70 mole % of the organosilane, and from about 25 mole % to about 40 mole % of the boron oxide compound are combined to form the metal oxide sols.

In one embodiment, from about 15% to about 60% by weight of the metal alkoxide, from about 25% to about 75% by weight of the organosilane, and from about 5% to about 30% by weight of the boron oxide compound are combined to form the metal oxide sols. In another embodiment, from about 20% to about 55% by weight of the metal alkoxide, from about 30% to about 70% by weight of the organosilane, and from about 5% to about 25% by weight of the boron oxide compound are combined to form the metal oxide sols. In yet another embodiment, from about 25% to about 50% by weight of the metal alkoxide, from about 35% to about 65% by weight of the organosilane, and from about 10% to about 20% by weight of the boron oxide compound are combined to form the metal oxide sols.

One or more of any suitable organic solvent may be employed to combine the metal alkoxide, organosilane, and boron oxide compounds. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the present invention.

The metal alkoxide, organosilane, and boron oxide compounds are combined with water and/or an organic solvent at a temperature suitable to facilitate mixing and/or the formation of the metal oxide sols. In one embodiment, the temperature while combining components is maintained from about 20° C. to about 100° C. In another embodiment, the temperature while combining components is maintained from about 30° C. to about 90° C.

The metal oxide sols may be stored in a wet or dry state. In the wet state, the metal alkoxide, organosilane, boron oxide compounds, and organic solvent and/or water are simply stored in a container. When storage in a wet state is employed, delivery and movement of the metal oxide sols is facilitated by minimizing the amount of liquid. In one embodiment, the metal oxide sols may be stored in a wet state for at least about 3 months. In another embodiment, the metal oxide sols may be stored in a wet state for at least about 6 months.

When storing in a dry state, the metal oxide sols in the wet state are subject to an evaporation technique, with optional heating, to remove the liquids present. A vacuum may be employed. The resultant dry metal oxide sols are in a powder-like form. In one embodiment, the metal oxide sols may be stored in a dry state for at least about 3 months. In another embodiment, the metal oxide sols may be stored in a dry state for at least about 6 months.

In one embodiment, the dried metal sols contain from about 15% to about 60% by weight of the metal alkoxide, from about 25% to about 75% by weight of the organosilane, and from about 5% to about 30% by weight of the boron oxide compound. In another embodiment, the dried metal sols contain from about 20% to about 55% by weight of the metal alkoxide, from about 30% to about 70% by weight of the organosilane, and from about 5% to about 25% by weight of the boron oxide compound.

In one embodiment, the dried metal sols contain less than about 0.5% by weight water. In another embodiment, the dried metal sols contain less than about 0.1% by weight water. In yet another embodiment, the dried metal sols contain less than about 0.05% by weight water.

When storing in a dry state, the dried sols can be heated up to about 100° C. for about 2 hours without degradation. Also when storing in a dry state, the dried sols can be stored in at least a semi-airtight container, although this is not necessary. Due to the stability of the metal oxide sols, an advantage is that they may be stored in the open air without degradation. This is because it is believed that the metal oxide sols resist water uptake and/or are stable to oxidation. It is another alternative to store the dried sols in an airtight container or in a vacuum pack/state.

A polymer composite contains at least a polymer and the metal oxide sols. The polymer composite may further contain optional additives such as, for example, coupling agents (silane, titanium, or zirconium coupling agents), surfactants, and fillers. Additives can enhance sol-polymer compatibility. The metal oxide sols are incorporated into the polymer matrix on a nanoscale basis in a substantially uniform manner (the sols are uniformly dispersed throughout the polymer). Generally speaking, polymers include thermosets, thermoplastics, synthetic rubbers, extrudable polymers, injection molding polymers, moldable polymers, and the like.

The polymer is any suitable material capable of forming a pre-polymer material, a partially polymerized material or a polymer, that incorporate the metal oxide sols. The polymer may be polymer monomers, a B-staged polymer, or a polymer. In one embodiment, the polymer is at least one of a polyacrylate such as polymethylmethacrylate, an unsaturated polyester, a saturated polyester, a polyolefin (polyethylenes, polypropylenes, polybutylenes, and the like), an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, copolymers of two or more thereof, and the like.

Suitable polymers include acrylic resins. Examples of acrylic monomers include monoacrylics, diacrylics, triacrylics, tetraacrylics, pentacrylics, etc. Examples of polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethyl methacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy) ethylester, and polyfurfurylmethacrylate, poly(ethylene glycol)methacrylate, polyacrylic acid and poly(propylene glycol)methacrylate.

Examples of suitable diacrylates which can be used to form polyacrylates include 2,2-bis(4-methacryloxyphenyl) propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di-trimethylolpropane tetraacrylate, and ethoxylated pentaerythritol tetraacrylate. Examples of pentaacrylates include dipentaerythritol pentaacrylate and pentaacrylate ester.

Polyacrylates include other aliphatically unsaturated organic compounds, such as polyacrylamides and unsaturated polyesters, which are condensation products of unsaturated dicarboxylic acids and diols, and vinyl compounds, or compounds having a terminal double bond. In one embodiment, these materials are co-cured with the acrylic component by free radical technique. Examples of vinyl compounds include N-vinylpyrrollidone, styrene, vinyl naphthalene and vinylphtalimide. Polyacrylamides (including poly(meth)acrylamide derivatives) are commercially available. Some of the particular (meth)acrylamide derivatives useful in the present invention include N-alkyl- or N-alkylene-substituted or unsubstituted (meth)acrylamides. Specific examples thereof are acrylamide, methacrylamide, N-methacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n-propylmethacrylamide, N-acryloyloylpyrrolidine, N-methacryloylpyrrolidine, N-acryloylpiperidine, N-methacryloylpiperidine, N-acryloylhexahydroazepine, N-acryloylmorpholine and N-mathacryloylmorpholine.

Other suitable polymers include unsaturated and saturated polyesters including alkyd resins. The polyesters may be condensation polymers derived by the condensation of polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are or are not subject to cross-linking.

The unsaturated polyesters are prepared by reacting the one or more unsaturated polybasic acids or anhydrides with the polyols (di- or tri-hydroxy compounds) in approximately equal proportions. Examples of such polyesters include polyesters prepared from: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). A wide variety of polyester resins that can be used are commercially available.

Suitable polymers include epoxy resins. Epoxy resins include resins comprised of monomers, oligomers, and polymers containing one or more oxirane rings. A wide variety of such resins are available commercially. Such resins have either a mixed aliphatic-aromatic or an exclusively non-benzeneoid (i.e., aliphatic or cycloaliphatic) molecular structure. Representative examples of acceptable substituent groups include halogens, ester groups, ether groups, sulfonate groups, siloxane groups, nitro groups, and phosphate groups.

Epoxy resins are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350–400 and an epoxide equivalent of about 175–210. Epoxy resins such as Araldite 6010, manufactured by Ciba-Geigy can also be utilized. These epoxy resins are of the glycidyl-type epoxide, and are preferably diglycidyl ethers of bis-phenol A which are derived from bisphenol and epichlorohydrin.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent. Another group of epoxy resins are available from Furane Plastics Inc., Los Angeles, Calif. under the general trade designations EPIBOND and EPOCAST. For example, EPI-BOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." and "D.E.W." resins obtainable from Dow Chemical Company and "Epotuf" liquid epoxy resins obtainable from Reichhold Chemicals Inc. are examples of such resins preferred for employment in accordance with the invention. An example of an "Epotuf" liquid epoxy resin in the undiluted medium high viscosity #37–140 having an epoxide equivalent weight of 180–195, a viscosity (ASTM D445) of 11,000–14,000 cps at 25° C., and a Gardner Color Maximum of 3.

In some embodiments of the invention the epoxy resins may be "solubilized" by neutralization with a basic compound such as an organic amine. Examples of amines include amines and hydroxyamines including diethylamine, triethylamine, triethanolamine, dimethylethanolamine, etc. Epoxy resins also include polyamide modified epoxy resins, such as AF-42 from Minnesota Mining and Manufacturing Co.

Additional examples of the epoxy resins derived from amines include tetraglycidyldiaminodiphenylmethane, triglycidyl-p-aminophenol, triglycidyl-m-aminophenol and triglycidylaminocresol and their isomers, examples of the epoxy resins derived from phenols include bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the present invention is not restricted to the use of these compounds. Furthermore, mixtures of two or more of the epoxy resins can be used and monoepoxy compounds can also be incorporated.

Generally, epoxy resins for use in the invention are compositions comprising glycidyl ether monomers. Representative examples of these are the glycidyl ethers of polyhydric phenols obtained by reacting a polyhydric phenol with an excess of chlorohydric, such as epichlorohydrin. Specific examples of epoxy resins include 2,2-bis[4-(2,3-epoxypropoxy)phenyl]propane(diglycidyl ether of bisphenol A) and commercially available materials under the trade designation "Epon 828F", "Epon 1004F" and "Epon 1001F" available from Shell Chemical Co., "DER-331", DER-332" and "DER-334" available from the Dow Chemical Co. Preferred is the diglycidyl ether of bisphenol A, "CMD 35201" available from Rhone Poulenc, Inc., Louisville, Ky. Other suitable epoxy resins include glycidyl ethers of phenol formaldehyde novolak resins (e.g., "DEN-431" and "DEN-438" available from the Dow Chemical Co.), and resorcinol digylcidyl ether. Additional examples of epoxides are described in U.S. Pat. No. 3,018,262, incorporated herein by reference.

Epoxy resins further include UV curable epoxies and cycloaliphatic epoxy resins. UV curable epoxies and cycloaliphatic epoxy resins are available under the trade designation Cyracure® specificaly including products 6100, 6105, 6110, and 6351 from Union Carbide/Dow Chemical.

Suitable polymers include polyamides. In particular, the polymers may be an aliphatic or aromatic polyamides. Polyamides are commercially available. Examples of polyamides include those under the trade designations Zytel available from DuPont, Capron from AlliedSignal, Texapol from Hanna, Ashlene from Ashley, Ultramid from BASF, Durethan from Bayer, Grilamid from EMS, Vestamid from Huls America, Vydyne from Monsanto, Wellamid from Wellman and others.

Specific examples of polyamides include nylon 6 (polycaprolactam), nylon 6/6 (polyhexamethyleneadipamide), nylon 6/10 (condensation product of hexamethylenediamine and sebacic acid), nylon 6/12, nylon 6/T (polyhexamethylene terephthalamide), nylon 7 (polyenanthamide), nylon 8 (polycapryllactam), nylon 9 (polypelargonamide), nylon 10, nylon 11, nylon 12, nylon 55, nylon XD6 (poly metha-xylylene adipamide), nylon 6/I, poly -alanine, NOMAX® 410 available from DuPont, polyamides under the trade designations PA 7030 and 5050 available from Dow, and Ultramid K1297/2 available from BASF.

Suitable polymers include polyimides. Polyimides can be prepared by reacting a diisocyanate with a dianhydride, or a dianhydride with an aromatic diamine (such as 3,3', 4,4'-benzophenonetetracarboxylic dianhydride-co-4, 4'-oxydianiline and methylenedianiline). Examples of polyimides include KAPTON and VESPEL available from DuPont.

Suitable polymers include polyetherimides. Polyetherimides are polymers containing ether and imide linkages. For example, polyetherimides can be prepared by reacting at least one diamine, such as m-phenylenediamine or p-phenylenediamine, with at least one ether dianhydride, such as 2,2-bis[(3,4-dicarboxyphenoxy)phenyl]propane dianhydride. Polyetherimides are commercially available. Examples of polyetherimides include those under the trade designation ULTEM-1000, ULTEM4000 and ULTEM-6000 from General Electric, RTP 2101, 2103 and 2105 from RTP and Thermofil W-10FG0100, W-20FG0100 and W-30FG0100 from Thermofil. Polyetherimides also include silicone polyetherimides.

Suitable polymers also include polyamideimides. Polyamideimides may be prepared by condensing an imide and an amide. Polyamideimides are commercially available. Examples of polyamideimides include those under the trade designation TORLONTM available from Amoco and Lack E 3560/32 and 3561/27 available from Herberts Gmbh.

Suitable polymers include polyesterimides. Polyesterimdes are commercially available. Examples of polyesteramides include TERBEC® 533 L-33 available from BASF, IMIDEX-E available from General Electric and those made according to U.S. Pat. Nos. 3,426,098 and 3,697,471 which are herein incorporated by reference.

Suitable polymers include polyesteramideimides. Polyesteramideimides are commercially available. Examples of polyesteramideimides include copolymers of any combination of a polyester, a polyamide and polyimide.

The polymer composite contains a major amount of the polymer and a minor amount of the metal oxide sols, and optionally a minor amount of additives such as coupling agents. A major amount means at least 50% by weight or more, while a minor amount means less than 50% by weight. In another embodiment, polymer composites of the present invention contain from about 75% by weight to about 99.99% by weight of the polymer and from about 0.01% by weight to about 25% by weight of the metal oxide sols. In yet another embodiment, polymer composites of the present invention contain from about 90% by weight to about 99.9% by weight of the polymer and from about 0.1% by weight to about 10% by weight of the metal oxide sols.

The polymer composite is made by combining suitable amounts of the polymer and the metal oxide sols. If the metal oxide sol is stored in a dry state, it can be combined with an organic solvent and/or water before it is combined with the polymer. The polymer is preferably in a liquid or semi-liquid state. The polymer and the metal oxide sols are mixed to facilitate uniform distribution of the sols within the polymer. In one specific embodiment, the metal oxide sol powder (stored in a dry state) is combined with a polymer or prepolymer powder, and the mixture is then melted and molded or extruded.

After combining and mixing suitable amounts of the polymer and the metal oxide sols, the mixture is then cured, molded, extruded, formed, or subjected to suitable polymer processing to form a polymer composite having metal oxide sols substantially uniformly dispersed therein. In the case of a translucent polymer, for example a polyacrylate, the resultant polymer composite is also translucent, indicating that the metal oxide sols are dispersed on a nanoscale. Polymer composites are generally smooth, further indicating that the metal oxide sols are dispersed on a nanoscale.

The present invention further provides methods of improving certain properties in polymer compositions, such as one or more of methods of improving strength, methods of improving corona resistance, methods of improving plasma resistance, methods of improving resistance to organic solvents, methods of improving high temperature stability, methods of improving flame retardancy, methods of improving oxidative stability, methods of modifying refractive index, methods of improving fracture properties, methods of improving abrasion resistance, methods of improving liquid permeability, methods of improving gas permeability including methods of improving gas permeability to specific gases, and methods of improving (low) hysteresis loss (low rolling resistance). The methods of improving certain properties in polymer compositions is accomplished by incorporating the metal oxide sols into a polymer system.

The following examples illustrate the present invention. Unless otherwise indicated in the following examples and elsewhere in the specification and claims, all parts and percentages are by weight, all temperatures are in degrees Centigrade, RT is room temperature, and pressure is at or near atmospheric pressure.

Examples 1 and 2 and Comparative Examples 1–5 involve preparation and evaluation of mixed metal oxide sols. The following seven sol solutions are prepared as shown in Table 1. They are prepared by the following procedure: (1) preparation of a mixture of aluminum isopropoxide and methoxyethanol in a vial; (2) addition of phenyltrimethoxysilane and/or tetraethoxysilane followed by stirring for 1 hr/RT; (3) addition of boric acid followed by stirring for 1 hr/RT; and (4) addition of water followed by stirring overnight/RT.

TABLE 1

| Ex No | Al(O-iPr)$_3$ gm (mmol) | Si(OEt)$_4$ gm (mmol) | PhSi(OMe)$_3$ gm (mmol) | B(OH)$_3$ gm (mmol) | H$_2$O gm (mmol) | MeOEtOH gm |
|---|---|---|---|---|---|---|
| CE1 | 0.192 (0.94) | 0 | 0 | 0 | 0 | 0.26 |
| CE2 | 0.432 (2.12) | 0 | 0 | 0.132 (2.12) | 0.057 (3.17) | 1.3 |
| CE3 | 0.217 (1.06) | 0.238 (1.14) | 0 | 0 | 0.066 (3.67) | 0.29 |
| CE4 | 0.143 (0.7) | 0.208 (1) | 0.179 (0.9) | 0 | 0.083 (4.61) | 1 |
| CE5 | 0.23 (1.13) | 0 | 0.3 (1.52) | 0 | 0.117 (6.5) | 1 |
| Ex 1 | 0.284 (1.39) | 0 | 0.347 (1.75) | 0.132 (2.13) | 0.057 (3.17) | 1 |
| Ex 2 | 0.376 (1.84) | 0.546 (2.63) | 0.458 (2.31) | 0.174 (2.81) | 0.16 (8.9) | 1 |

Polyimide—metal oxide sol compatibility is determined using a polyamic acid solution (14 wt %) that is prepared by diluting poly (3,3', 4,4'-benzophenonetetracarboxylic dianhydride-co-4, 4'-oxydianiline/1,3-phenylenediamine), amic acid (19 wt. %, from Aldrich Chemical) with n-methylpyrrolidinone (NMP). A mixture of the sol and the polyamic acid is mixed in a vial, cast on a glass plate, then cured on a hot plate (60° C./20 min.+150° C./1 hr+250° C./30 min.+330° C./1 hr). The results summarized in Table 2, evaluation of polyimide-sol compatibility, indicate that metal oxide sols prepared in the presence of an organosilane and a boron oxide compound can remarkably improve polymer-sol compatibility.

TABLE 2

| Sol No | Sol soln gm | Polyamic acid gm | PI/sol mix | PI/sol cured film |
|---|---|---|---|---|
| CE1 | 0.04 | 0.2 | precipitates | opaque/rough |
| CE2 | 0.04 | 0.22 | precipitates | opaque/rough |
| CE3 | 0.024 | 0.2 | precipitates | opaque/rough |
| CE4 | 0.024 | 0.2 | gel (<20 min) | hazy/rough |
| CE5 | 0.024 | 0.2 | gel (<5 min) | hazy/rough |
| Ex 1 | 0.04 | 0.22 | no gel (>1 wk) | clear/smooth |
| Ex 2 | 0.02 | 0.26 | no gel (>1 wk) | clear/smooth |

EXAMPLE 3

Example 3 shows the preparation of metal oxide sols by an alternative procedure compared to Examples 1 and 2. A solution of aluminum isopropoxide (0.286 gm, 1.4 mmol) and methoxyethanol (1.0 gm) is first prepared. Boric acid (0.087 gm, 1.4 mmol) is added and stirred to form a clear gel. Phenyltrimethoxysilane (0.285 gm, 1.68 mmol) is added and stirred overnight to regenerate a non-gel solution. Next, water (0.035 gm, 2 mmol) is added and stirred overnight at room temperature to give a slightly hazy solution. The sol solution (20 wt %, 0.025 gm) is mixed with the polyamic acid (0.2 gm) described in connection with Examples 1 and 2. The resulting clear solution is cast on a glass plate and cured to give a clear/smooth film.

EXAMPLE 4

Example 4 shows the preparation of sol by another alternative procedure compared to Examples 1 and 2. A clear solution of phenyltrimethoxysilane (0.099 gm, 0.5 mmol), boric acid (0.031 gm, 0.5 mmol), and methoxyethanol (0.28 gm) is prepared. A solution of aluminum isopropoxide (0.102 gm, 0.5 mmol) and methoxyethanol (0.14 gm) is added and stirred for 1 hr. Water (0.024 gm, 1.3 mmol) is subsequently added and stirred overnight to give a slightly hazy solution. Therefore, additional phenyltrimehoxysilane (0.046 gm, 0.023 mmol) is added and stirred overnight to form a clear solution. The sol solution (0.025 gm) is mixed with the polyamic acid (0.2 gm) described in connection with Examples 1 and 2. The resulting clear solution is cast on a glass plate and cured to give a clear and smooth film.

EXAMPLE 5

Example 5 shows perparation of a mixed metal oxide sol based on aluminum oxide and phenylboronic acid. To a mixture of aluminum isopropoxide (0.218 gm, 1.07 mmol) and methoxyethanol (0.97 gm), phenylboronic acid (0.198 gm, 1.62 mmol) is added and the resulting mixture is stirred overnight at room temperature to give a clear solution. Subsequently, water (0.029 gm, 1.61 mmol) is added and the resulting solution is stirred overnight at room temperature. A drop of the solution is mixed with a drop of polyamic acid (14 wt % solution) on a glass plate resulted in gel formation.

The resulting sol/NMP solution (0.025 gm) is subsequently mixed with the polyamic acid (0.16 gm, 14 wt %) described in connection with Examples 1 and 2 to give a clear solution. The solution is cast on a glass plate and cured to give a clear and smooth film.

Examples 7 and 8 show mixed metal oxide sols based on titanium oxide. The following two sols are prepared by the following procedure: (1) preparation of a mixture of titanium isopropoxide and methoxyethanol in a vial; (2) addition of alkoxysilane followed by stirring for 1 hr/RT; (3) addition of boric acid followed by stirring for 1 hr/RT; and (4) addition of water followed by stirring overnight/RT. The resulting sol solutions, when incorporated into the polyamic acid (~10 wt % sol) and cured on a glass plate, give clear and smooth films.

TABLE 3

| Ex No | $Ti(OiPr)_2$ gm (mmol) | $Si(OEt)_4$ gm (mmol) | $PhSi(OMe)_3$ gm (mmol) | $B(OH)_3$ gm (mmol) | $H_2O$ gm (mmol) | MeOEtOH gm |
|---|---|---|---|---|---|---|
| Ex 7 | 0.268 (0.94) | 0 | 0.248 (1.3) | 0.077 (1.24) | 0.034 (1.9) | 0.7 |
| Ex 8 | 0.418 (1.47) | 0.204 (0.98) | 0.196 (0.99) | 0.121 (1.95) | 0.066 (3.7) | 1.05 |

The above sol solution (1.27 gm) is, therefore, further treated with phenyltrimethoxysilane (0.198 gm) overnight at room temperature to give a slightly hazy solution. A blend of the sol solution and the polyamic acid solution (~10 wt % sol) gives a clear solution, which, when cured on a glass plate, gives a clear and smooth film.

Examples 9 and 10 describe mixed metal oxide sols based on 80% zirconium oxide. The following mixed metal oxide sols are prepared by the procedure described in Examples 7 and 8. The resulting sol solutions, when incorporated into the polyamic acid (~10 wt % sol) and cured on a glass plate, give clear and smooth films.

TABLE 4

| Ex No | $Zr(OBu)_4$ gm (mmol) | $Si(OEt)_4$ gm (mmol) | $PhSi(OMe)_3$ gm (mmol) | $B(OH)_3$ gm (mmol) | $H_2O$ gm (mmol) | MeOEtOH gm |
|---|---|---|---|---|---|---|
| Ex 9 | 0.346 (0.72) | 0 | 0.198 (1) | 0.059 (0.95) | 0.026 (1.6) | 0.73 |
| Ex 10 | 0.438 (0.96) | 0.193 (0.95) | 0.188 (0.95) | 0.092 (1.48) | 0.06 (3.3) | 1.2 |

EXAMPLE 6

Example 6 shows the preparation of a mixed metal oxide sol based on aluminum oxide and boron tributoxide. A mixture of aluminum isopropoxide (0.412 gm, 2 mmol), methoxyethanol (0.43 gm), phenyltrimethoxysilane (0.502 gm, 2.5 mmol), and boron tributoxide (0.558 gm, 2 mmol) is stirred for 1 hr at room temperature. To the solution, water (0.23 gm, 10 mmol) is added and the resulting mixture is stirred overnight at room temperature. The resulting sol solution (0.339 gm) is dried (2 hr/air dry+2 hr/vacuum dry) and then mixed with NMP (0.85 gm) to give a clear solution.

Examples 11–13 describe mixed metal oxide sols based on aluminum oxide and vinyltrimethoxysilane: The following three sols are prepared by the following procedure: (1) preparation of a mixture of transition metal alkoxide and methoxyethanol in a vial; (2) addition of vinyltrimethoxysilane followed by stirring for 1 hr/40° C.; (3) addition of boric acid followed by stirring for 2 hr/RT+1 hr/50° C.; (4) addition of water followed by stirring overnight/RT. The resulting sol solutions, when incorporated into the polyamic acid (~10 wt % sol) and cured on a glass plate, give clear and smooth films.

TABLE 5

| Ex No | metal alkoxide gm (mmol) | $VinylSi(OMe)_3$ gm (mmol) | $B(OH)_3$ gm (mmol) | $H_2O$ gm (mmol) | MeOEtOH gm |
|---|---|---|---|---|---|
| Ex 11 | [i-Pr-O]$_3$Al 0.432 (2.1) | 0.399 (2.7) | 0.131 (2.1) | 0.068 (3.8) | 2.1 |
| Ex 12 | [i-Pr-O]$_4$Ti 0.639 (2.25) | 0.449 (3.03) | 0.187 (3.03) | 0.081 (4.5) | 1.7 |

TABLE 5-continued

| Ex No | metal alkoxide gm (mmol) | VinylSi(OMe)$_3$ gm (mmol) | B(OH)$_3$ gm (mmol) | H$_2$O gm (mmol) | MeOEtOH gm |
|---|---|---|---|---|---|
| Ex 13 | 80% [i-Pr-O]$_4$Zr 0.288 (06) | 0.126 (0.85) | 0.05 (0.81) | 0.025 (1.4) | 0.5 |

EXAMPLE 14

Example 14 describes a metal oxide sol powder, and PI/sol and PAI/sol systems made therefrom. The sol solutions prepared in Examples 2 and 3 and 9–13 are first dried (air dry followed by vacuum dry) to give the corresponding sol powders. They are then dissolved in NMP to give clear solutions (10–20 wt % sol) that are highly stable and can be stored for a long period of time (no precipitation/gelation >2 months at room temperature). The compatibility of these dried sols with polyimide and polyamideimide is determined. Polyamideimide solution (18%) is prepared by diluting poly (trimellitic anhydride chloride-co-4,4'-methylenedianiline) powder (purchased from Aldrich Chemical) with NMP. The sol solutions are added to the polyamic acid (as described in Examples 1 and 2) and polyamideimide in vials, respectively, to give clear solutions (10–20 wt % sol) that are stable and show no formation of precipitation/gelation even after >2 months in a refrigerator. The solutions are cast on a glass plate and cured on a hot plate.

The cure conditions used for polyamideimide are 60° C./20 min+150° C./1 hr+250° C./30 min+280° C/1 hr. In each case, cured PI/sol and PAI/sol films are clear and smooth. The dried sol powders kept in vials for >2 months at room temperature are also directly dissolved into these polyamic acid and polyamideimide solutions, respectively, to obtain clear solutions. Cured polymer/sol films are clear and smooth, indicating uniform distribution of nanoscale metal oxide sols in the polymer matrices.

EXAMPLE 15

Example 15 describes the preparation of epoxy/metal oxide sol systems. A mixture of bisphenol A diglycidyl ether (0.34 gm), bisphenol A propoxylate/ethoxylate (0.035 gm), the sol solution prepared in Example 14 (0.26 gm) and glycidoxypropyltrimethoxysilane (Z6040, 0.02 gm) is prepared. The mixture is equally divided into two and further mixed with a catalyst; the first half with dimethylaminomethylphenol catalyst (0.008 gm) and the other half with a BF3-amine catalyst (0.005 gm). Both catalyzed mixtures are then cast on a glass plate, respectively, and cured at 50° C./20 min+180° C./2 hr) to give clear and smooth films.

EXAMPLE 16

Example 16 describes the preparation of epoxymetal oxide/sol systems. The sol solutions prepared in Examples 1, 7, and 9 are dried (air dry followed by vacuum dry). The resulting sol powders (0.015 gm) are mixed with bisphenol A diglycidyl ether (0.170 gm) and dimethylaminomethylphenol catalyst (0.005 gm). The mixtures are coated on a glass plate and cured (50° C./20 min+180° C./2 hr) to give clear and smooth films.

EXAMPLE 17

Example 17 describes the preparation of epoxy/metal oxide sol systems from dry sol powder. Three dried sol powders from the sol solutions prepared in Examples 1, 7, and 9 are used to evaluate epoxy/sol compatibility. The metal oxide sol powders obtained by drying in air for 2 hrs followed by vacuum dry for 2 hrs are kept in glass vials for >3 months before use. The epoxy/sol mixtures are prepared by admixing these sol powders (0.048 gm) with bisphenol A diglycidyl ether (0.16 gm), glycidoxypropyltrimethoxysilane (Z6040, 0.02 gm), and acetone (0.1 gm), respectively. The resulting solutions are cast on glass plates and heat-treated (80° C./30 min and 200° C./3 hrs) to give hard films that are optically transparent.

EXAMPLE 18

Example 18 describes the preparation of acrylate/sol systems. A metal oxide sol solution having acrylic functionality is prepared from aluminum isopropoxide (0.204 gm), methoxyethanol (0.361 gm), methacryloxypropyltrimethoxysilane (Z6030, 0.248 gm), boric acid (0.062 gm), and water (0.056 gm) by following the procedure described in Examples 7 and 8. The resulting metal oxide sol solution is subsequently dried (air dry/3 hrs+vacuum dry/2 hrs) to obtain dry sol powders. An acrylate/sol solution is prepared by admixing the above dried sol (0.046 gm), epoxy acrylate (CN104D80 from Sartomer Co., 0.3 gm), hydroxyethyl methacrylate (0.04 gm), and benzil dimethyl ketal photoinitiator (0.006 gm). The resulting clear solution is cast on a glass plate and cured by exposing to UV light (365 nm) under nitrogen for 3 minutes. The resulting film is hard, smooth, and optically transparent.

EXAMPLE 19

Example 19 describes the preparation of acrylate/sol systems from dried metal oxide sol powder. Three dried sol powders from the sol solutions prepared in Examples 1, 7, and 9 are used to evaluate acrylate/sol compatibility. The metal oxide sol powders obtained by drying in air for 2 hrs followed by vacuum dry for 2 hrs are kept in glass vials for >3 months before use. The acrylate/metal oxide sol mixtures are prepared by admixing these sol powders (0.045 gm) with epoxy acrylate (CN104D80 from Sartomer Co., 0.3 gm), hydroxyethyl methacrylate (0.04 gm), methacryloxypropyltrimethoxysilane (Z6030, 0.022 gm), and benzil dimethyl ketal photoinitiator (0.006 gm), respectively. The resulting clear solutions are cast on glass plates and cured by exposing to UV light (365 nm) under nitrogen for 3 minutes. The resulting films are hard, smooth, and optically transparent.

EXAMPLE 20

Example 20 describes the preparation of polyurethane/ metal oxide sol systems from dried sol powder. Three dried sol powders prepared in Examples 1, 7, and 9 and stored at room temperature for over 3 months are used to evaluate polyurethane/metal oxide sol compatibility. A mixture of the sol powder (0.06 gm), glycerol propoxylate (MW 1500, 0.14 gm), glycerol propoxylate (MW3000, 0.08 gm) and bisphenol A propoxylate (0.08 gm) in acetone (0.5 gm) is stirred overnight at room temperature. To the mixture, 3-aminopropyl trimethoxysilane (0.005 gm) and isophorone diisocyanate (0.048 gm) are added and the resulting solution is stirred for additional 2 hrs. Subsequently, isophorone diisocyanate (0.098 gm) is added. The resulting solution is then cast on a glass plate and allowed to stand at room temperature for 2 hrs and 80° C. for 2 hrs to generate optically transparent, non-yellowing films. The use of tin catalysts widely used for poyurethane systems is found to accelerate the reaction even in the presence of the sol additives. For example, addition of dibutyltin dilaurate (0.008 gm) to the above mixture is able to provide a tackfree film after 2 hrs at room temperature.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composite composition comprising:
   a major amount of a polymer;
   a minor amount of a metal oxide sol substantially uniformly dispersed within the polymer, the metal oxide sol comprising from about 15% to about 60% by weight of at least one metal alkoxide; from about 25% to about 75% by weight of at least one organosilane; and from about 5% to about 30% by weight of at least one boron oxide compound.

2. The composite composition according to claim 1, wherein the composite composition comprises from about 75% by weight to about 99.99% by weight of the polymer and from about 0.01% by weight to about 25% by weight of the metal oxide sols.

3. The composite composition according to claim 1, wherein the polymer is an acid containing polymer.

4. The composite composition according to claim 1, wherein the polymer comprises at least one selected from the group consisting of a polyacrylate, an unsaturated polyester, a saturated polyester, a polyolefin, an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, and copolymers of two or more thereof.

5. The composite composition according to claim 1, wherein
   the organosilane comprises an organofunctional silane represented by Formula III:

(R²)₄₋cSi(X²)c    (III)

wherein c is 2 or 3, each X² is individually an alkoxy group containing from 1 to about 4 carbon atoms, and each R² is individually a hydrogen or an organofunctional containing organic group containing from about 1 to about 24 carbon atoms including at least one from the group consisting of heterocyclic, acryloxy, amino, amide, vinyl, epoxy, glycidoxy, alkyl, a carbon carbon triple bond containing group, mercapto, siloxy, halocarbon, and a carbon carbon double bond containing group; and
   the boron oxide compound is selected from the group consisting of boric acid, boron tri-n-butoxide, boron tri-sec-butoxide, boron tri-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetylphenylboronic acid, 4-acetylphenylboronic acid, 5-chlorothiophene-2-boronic acid, 1,4-phenylenebis(boronic acid), (2-carboxyphenyl)boronic acid, (3-carboxyphenyl)boronic acid, (4-carboxyphenyl)boronic acid, (3,4-methylenedioxyphenyl)boronic acid, 4-methylthio)phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, and (4-methyl-1-naphthalene)boronic acid.

6. The composite composition according to claim 1, wherein the metal alkoxide is selected from the group consisting of aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, and lanthanium methoxyethoxide.

7. The composite composition according to claim 1, wherein the metal oxide sol is made by mixing:
   from about 10 mole % to about 45 mole % of at least one metal alkoxide, wherein the metal is a transition metal, a post-transition metal, an alkali metal, or alkaline earth metal;
   from about 25 mole % to about 80 mole % of at least one organosilane;
   from about 15 mole % to about 50 mole % of at least one boron oxide compound selected from the group consisting of boric acid, alkoxy boron compounds, hydrocarbyl boric acids, hydrocarbyl hydroxy boron alkoxides, and hydroxy boron alkoxides; and
   a liquid.

8. The composite composition according to claim 1, wherein the metal oxide sol comprises from about 25% to about 50% by weight of at least one metal alkoxide; from about 35% to about 65% by weight of at least one organosilane; and from about 10% to about 20% by weight of at least one boron oxide compound.

9. A composite composition comprising:
a major amount of a polymer;
a minor amount of a metal oxide sol substantially uniformly dispersed within the polymer, the metal oxide sol comprising from about 15% to about 60% by weight of at least one metal alkoxide, wherein the metal is at least one selected from the group consisting of aluminum, titanium, and zirconium; from about 25% to about 75% by weight of at least one organosilane; and from about 5% to about 30% by weight of at least one boron oxide compound.

10. The composite composition of claim 9, wherein the composite composition comprises from about 75% by weight to about 99.99% by weight of the polymer and from about 0.01% by weight to about 25% by weight of the metal oxide sols.

11. The composite composition of claim 9, wherein the polymer is an acid containing polymer.

12. The composite composition of claim 9, wherein the polymer comprises at least one selected from the group consisting of a polyacrylate, an unsaturated polyester, a saturated polyester, a polyolefin, an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, and copolymers of two or more thereof.

13. The composite composition of claim 9, wherein the organosilane comprises an organofunctional silane represented by Formula III:

$(R^2)_{4-c}Si(X^2)_c$        (III)

wherein c is 2 or 3, each $X^2$ is individually an alkoxy group containing from 1 to about 4 carbon atoms, and each $R^2$ is individually a hydrogen or an organofunctional containing organic group containing from about 1 to about 24 carbon atoms including at least one from the group consisting of heterocyclic, acryloxy, amino, amide, vinyl, epoxy, glycidoxy, alkyl, a carbon carbon triple bond containing group, mercapto, siloxy, halocarbon, and a carbon carbon double bond containing group.

14. The composite composition of claim 9, wherein the boron oxide compound is selected from the group consisting of boric acid, boron tri-n-butoxide, boron tri-sec-butoxide, boron tri-t-butoxide, boron triisopropoxide, boron tri-n-propoxide, boron trimethoxide, boron triethoxide, and hydroxy boron diisopropoxide.

15. The composite composition of claim 9, wherein the metal oxide sol comprises from about 25% to about 50% by weight of at least one metal alkoxide; from about 35% to about 65% by weight of at least one organosilane; and from about 10% to about 20% by weight of at least one boron oxide compound.

16. A method of making a composite composition comprising:
combining a major amount of a polymer and a minor amount of a metal oxide sol, the metal oxide sol comprising from about 15% to about 60% by weight of at least one metal alkoxide; from about 25% to about 75% by weight of at least one organosilane; and from about 5% to about 30% by weight of at least one boron oxide compound.

17. The method of claim 16, wherein the metal oxide sol is in a dry state when combined with the polymer.

18. The method of claim 16, wherein both the metal oxide sol and the polymer are in a dry state when combined, and further comprising melting the combination.

19. The method of claim 16, wherein the metal oxide sol is combined with an amount of water to facilitate formation of a stable metal oxide sol before being combined with the polymer.

20. The method of claim 16, wherein the polymer is in a liquid state when combined with the metal oxide sol.

* * * * *